United States Patent
Clark et al.

(10) Patent No.: US 6,516,384 B1
(45) Date of Patent: Feb. 4, 2003

(54) METHOD AND APPARATUS TO PERFORM A ROUND ROBIN AND LOCKING CACHE REPLACEMENT SCHEME

(75) Inventors: Lawrence T. Clark, Phoenix, AZ (US); Matthew M. Clark, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/476,444

(22) Filed: Dec. 30, 1999

(51) Int. Cl.[7] .............................................. G06F 12/00
(52) U.S. Cl. ........................ 711/109; 711/133; 711/144
(58) Field of Search ............................... 711/125, 133, 711/134, 136, 144, 151, 109; 710/104, 244; 707/100; 709/253

(56) References Cited

U.S. PATENT DOCUMENTS

| | | | |
|---|---|---|---|
| 4,783,735 A | * 11/1988 | Miu et al. | 711/136 |
| 5,029,072 A | 7/1991 | Moyer | 711/145 |
| 5,353,425 A | * 10/1994 | Malamy et al. | 711/144 |
| 5,408,629 A | * 4/1995 | Tsuchiya et al. | 711/151 |
| 5,787,431 A | * 7/1998 | Shaughnessy | 707/100 |
| 5,913,224 A | * 6/1999 | MacDonald | 711/125 |
| 5,928,343 A | * 7/1999 | Farmwald et al. | 710/104 |
| 5,928,352 A | 7/1999 | Gochman | 712/200 |
| 5,937,429 A | * 8/1999 | Kumar et al. | 711/133 |
| 6,044,478 A | * 3/2000 | Green | 714/42 |
| 6,073,182 A | * 6/2000 | Jones et al. | 709/253 |
| 6,098,152 A | * 8/2000 | Mounes-Toussi | 711/134 |
| 6,151,655 A | * 11/2000 | Jones et al. | 710/244 |
| 6,240,489 B1 | * 5/2001 | Durham et al. | 711/136 |

FOREIGN PATENT DOCUMENTS

GB     2284911 A     12/1993     .......... G06F/12/08

* cited by examiner

*Primary Examiner*—David Hudspeth
*Assistant Examiner*—Fred F. Tzeng
(74) *Attorney, Agent, or Firm*—Blakley, Sokoloff, Taylor & Zafman LLP

(57) ABSTRACT

A first plurality of registers are daisy chained together with each register associated with a particular cache line. Similarly, a second plurality of registers are daisy chained together with each register associated with a cache line. The first daisy chain defines a fill order of cache lines and the second daisy chain defines a lock order for the cache lines.

24 Claims, 4 Drawing Sheets

METHOD AND APPARATUS TO PERFORM A ROUND ROBIN AND LOCKING CACHE REPLACEMENT SCHEME

BACKGROUND

(1) Field of the Invention

The invention relates to cache replacement schemes. More specifically, the invention relates to combined round robin cache replacement and cache line locking schemes.

(2) Background

Various schemes exist for defining what data is replaced when a new data set is loaded into a cache. One favored scheme in direct mapped caches is a least recently used (LRU) scheme. In an LRU scheme, as the name implies, the block of data that has been used least recently is replaced with any incoming data. Because of the locality of reference common to computer software execution and data usage, this has been found to be a fairly efficient cache replacement scheme. However, as set associativity increases, the complexity and overhead for an LRU scheme make such schemes less attractive due to increasing hardware requirements.

Additionally, in content addressable memory (CAM)-based caches without separate decoders, high set-associativity is achieved, and identifying where to write fill data becomes increasingly problematic. One possible solution that has been employed is a round robin replacement scheme in which a circular shift register loops through identifying the line to be loaded. This has the effect of throwing away the oldest information in the cache, but the replacement is completely independent of the frequency of use. Thus, it can result in a greater amount of cache thrashing.

Some prior solutions to prevent data from being kicked out of the cache prematurely was to allow way locking. These systems failed to provide much granularity. For example, in a two-way cache, half the cache would be locked, even if the block of data to be retained was relatively small. This often results in inefficient cache usage.

BRIEF SUMMARY OF THE INVENTION

A first plurality of latches are daisy chained together, forming a register, with each latch associated with a particular cache line. Similarly, a second plurality of latches are daisy chained together with each latch associated with a cache line. The first register defines a fill order of cache lines and the second register defines a lock order for the cache lines.

DETAILED DESCRIPTION

Figure 1:
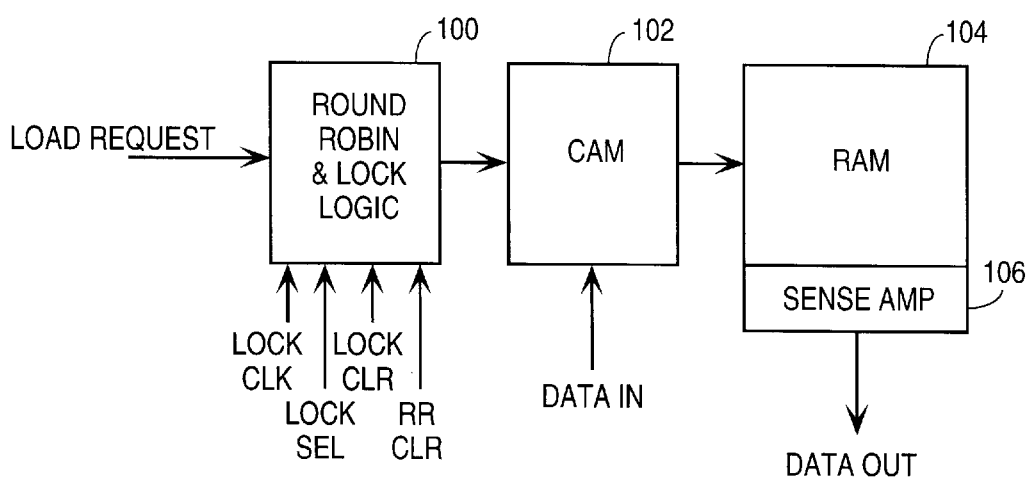
FIG. 1 is a block diagram of one embodiment of the invention.

FIG. 1 is a block diagram of one embodiment of the invention. A content addressable memory array (CAM) 102 is used to address into a random access memory unit (RAM) 104. The combination of CAM 102 and RAM 104 may typically be, for example, a cache and more particularly in one embodiment, a level zero cache, or possibly in an alternate embodiment, a translation lookaside buffer (TLB). In either case the CAM 102 contains the addresses corresponding to the corresponding entry, which is a line of code or data in the former case, and a page table entry in the latter. The data contained within the CAM entry is referred to as the "tag" entry in either case. A control logic unit, such as round robin and lock logic 100 is coupled to the CAM 102. The control logic unit controls the replacement scheme employed by the CAM addressed cache when data is to be written into the CAM 102 and RAM 104, e.g., which line is to be replaced on a cache fill operation. Both circuits, the CAM 102 and the RAM 104, may be written through means well known to those skilled in the art. The CAM 102 is accessed to determine the matching entry (if there is one) via the content-addressable nature of the CAM 102. If a match is found, data is read from RAM 104 as output through sense amp 106, which is coupled thereto, or a write operation to the RAM 104 may be performed through the same circuitry as used to write data into the RAM 104 during the aforementioned fill operation. In general, this form of cache circuit architecture has more favorable low-power characteristics as compared to more typical architectures utilizing RAM cells to store the tag data.

Round robin and lock logic 100, in addition to receiving load requests, receives a number of control signals, including a lock clock, a lock select, a lock clear, and a round robin clear. The lock clock when asserted indicates that the load request is a lock. When the lock clock is not asserted, the load is a fill. As used herein, lock is a load into a line that is to be locked, so as not to be overwritten by subsequent loads. A fill is a load that may be freely overwritten as part of the usual cache replacement scheme. Lock clear clears the lock register (discussed further below) to permit the subsequent overwriting of the previous loaded locks. Round robin clear resets the round robin register (also discussed further below) to a predetermined value. The lock select signal used as the mode select for a set of multiplexers that choose between signals from the round robin registers and the lock registers for word line enablement.

Figure 2:
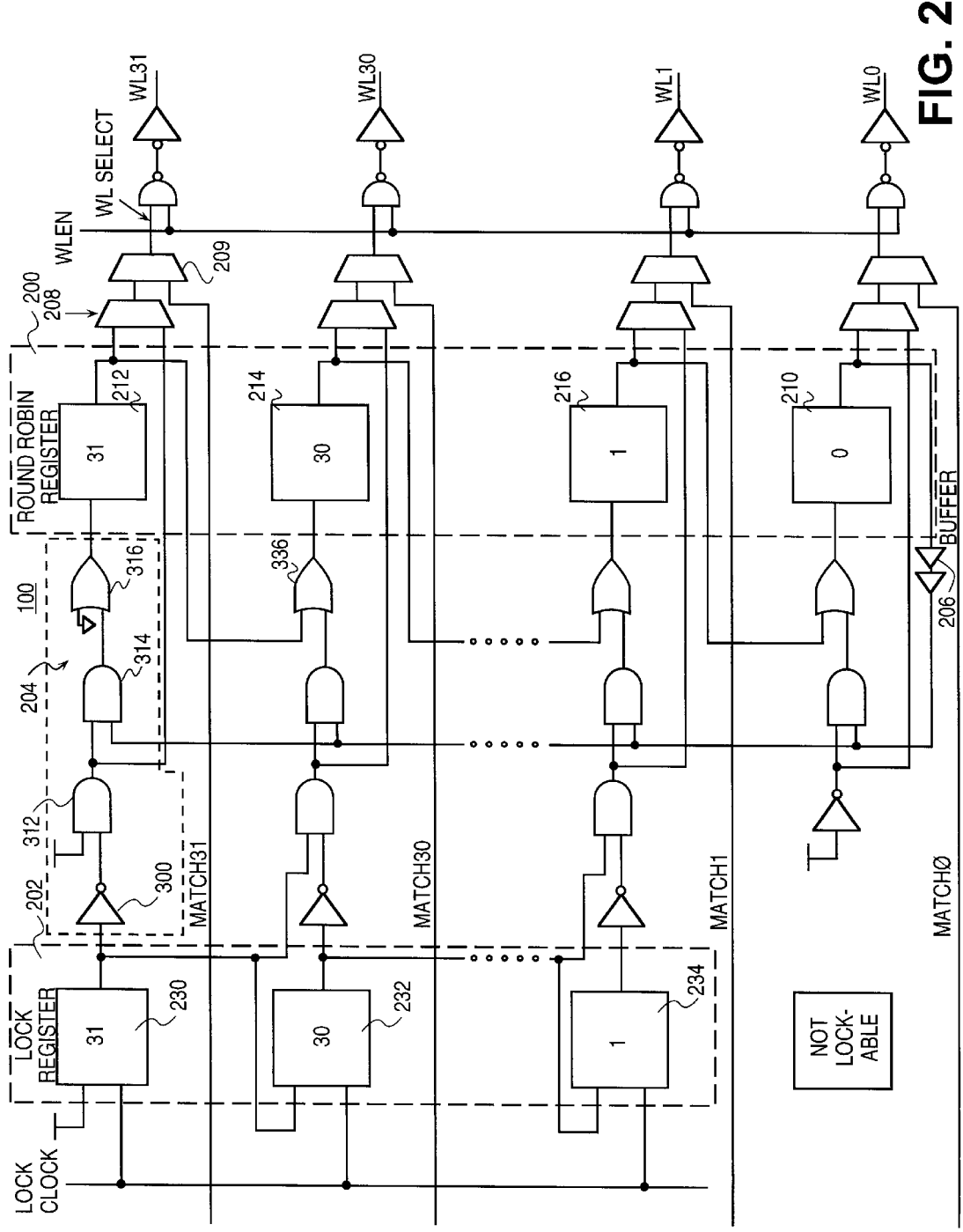
FIG. 2 is a block diagram of the round robin lock logic in one embodiment of the invention.

FIG. 2 is a block diagram of the round robin lock logic in one embodiment of the invention. The plurality of round robin latches 212, 214, 216, 210, are each associated with one line of a cache. In the shown embodiment, it is presumed that there are 32 lines in the array. However, more or fewer lines (and therefore, latches) are within the scope and contemplation of the invention. Accordingly, 32 round robin latches are provided, comprising the round robin register 200. A second plurality of latches, 230, 232, 234, comprising the lock register 202, also have one latch associated with each of a plurality of cache lines. In the shown embodiment, there are 31 lock latches which permit the locking of up to 31 of the 32 cache lines. By preventing one or more lines from being locked, the system avoids a deadlock condition in which new data needs to be loaded in the cache, but all lines are locked, preventing such a load. The lock latches are daisy chained together as are the round robin latches. In this manner, the lock register forces an ordered series of locks from top to bottom in the array responsive to the lock clock. The round robin register 200 cause circular fills beginning with a bottom line in the array followed by the highest unlocked line in the array and proceeding downward to the bottom and then circularly. Combinational logic 204 ensures that fills do not overwrite locked lines. In one embodiment, registers 200 and 204 are pulsed latches, and in an alternate embodiment, they are master slave flip-flops. The pulsed latches are more area efficient, but tend to be more susceptible to such issues as insufficient hold times over process skews.

The lock registers include the start latch 230 which corresponds to word line 31 of the array in operation has its input coupled to a positive power supply. Thus, when the lock clock is asserted, a high value appears at the output of register 230, and therefore, correspondingly on the input of register 232 which is daisy chained as shown. One issue that arises in an embodiment in using pulsed latches rather than master-slave flipflops is that sufficient delay must be built into the circuit to avoid both latches 230 and 232 (or more in the chain) from being set when lock clock is asserted. To resolve this issue, in the pulse latch embodiment of the invention, lock clock is a short pulse timed to be sufficiently long to allow one latch in the lock register to receive its input value, but sufficiently short to avoid the latch connected to output of the intended target latch from receiving the same data. Thus, on the next assertion of the lock clock, a high value will appear at the output of register 232, as well as 230. In this manner, the high value cycles down through the lock register 202 until it reaches lock latch 234 after 31 assertions of the lock clock. At that point, all 31 latches in the lock register 202 will have logical one's stored therein.

Round robin register 200 latches are coupled such that after assertion of the round robin reset signal, all latches except latch 210 are cleared. Latch 210 is the round robin start bit and is set responsive to a round robin clear signal. This signal is also asserted on a full-chip reset to initialize the cache. When latch 210 is set, that necessitates that fills will begin at word line zero. In addition to startup, the round robin reset signal is asserted responsive to a lock occurring. This ensures that a lock bit cannot be set coincident with the round robin bit which would constitute a logically illegal condition, i.e., that a locked line was selected to be the next target for a line fill. This scheme of setting the bottom, unlockable location for replacement when a lock operation is performed requires a minimum of logic. The implications of this scheme on the cache efficiency is addressed subsequently.

Accordingly, following a fill of word line zero, with the aid of combinational logic 204, the next fill line is identified to be the highest line that is not locked. Thus, if word line 31 is not yet locked, the output of latch 230 will be a zero, which will be inverted by inverter 310 causing AND gate 312 to output a "1," which causes AND gate 314 to also output a "1" to OR gate 316 which will then drive register 212 to output a high value, thereby selecting word line 31. Multiplexers 208 employ the lock select signal to determine whether the round robin register or the lock register selects the word lines. Thus, on a lock operation, the word line (WL) select is chosen to be taken from the output of gate 312, via the multiplexors 208 and 209. Thus the WL to be asserted, indicating the line to be filled on a lock is based on the coincidence of the previous lock latch being set to logical one and the present one being a logical zero. As can be inferred from the logic, the lock clock is asserted after each lock operation WL assertion. For a (non-locking) line fill, the multiplexor 208 asserts the WL by passing the logical one contained in the corresponding round robin latch to the WL SELECT node via multiplexor 209. The high signal will propagate through the round robin registers behaving as a pointer indicating a line for a next fill to occur. Multiplexor 209 selects between the output of multiplexor 208 and a CAM match signal which permits the CAM to assert the WL select during cache read and write operations that utilize the CAM for addressing. In an alternative embodiment, instead of a match signal, a decoder output may provide the second input to multiplexor 209.

Notably, start register 210 is the only register of the round robin registers with high fanout. As used herein, "high" fanout is deemed to be more than three inputs to be driven by the output of the device experiencing the fanout. Buffer 206 is used to buffer up the signal to accommodate the fanout as register 210 must drive an input signal for each of the other round robin registers. Conversely, the other round robin registers drive inputs only to their nearest neighbors. Consequently, they can be kept very small. This is desirable since there are two latches (in the pulsed-latch embodiment) per line in the cache, a number typically 32 in TLB's, but numbering into the thousands in the case of caches. This desirability of small size is the primary reason for employing an embodiment having the latch storage elements as pulsed latches rather than master-slave flipflops. In controlling the fanout, the device sizes and corresponding power consumption of the circuitry is reduced. Since the start register is at the bottom, layout of the buffer is simplified as area is available at the edge of the array, which corresponds to the sense and write circuitry area of the CAM and RAM circuits.

Figure 3:
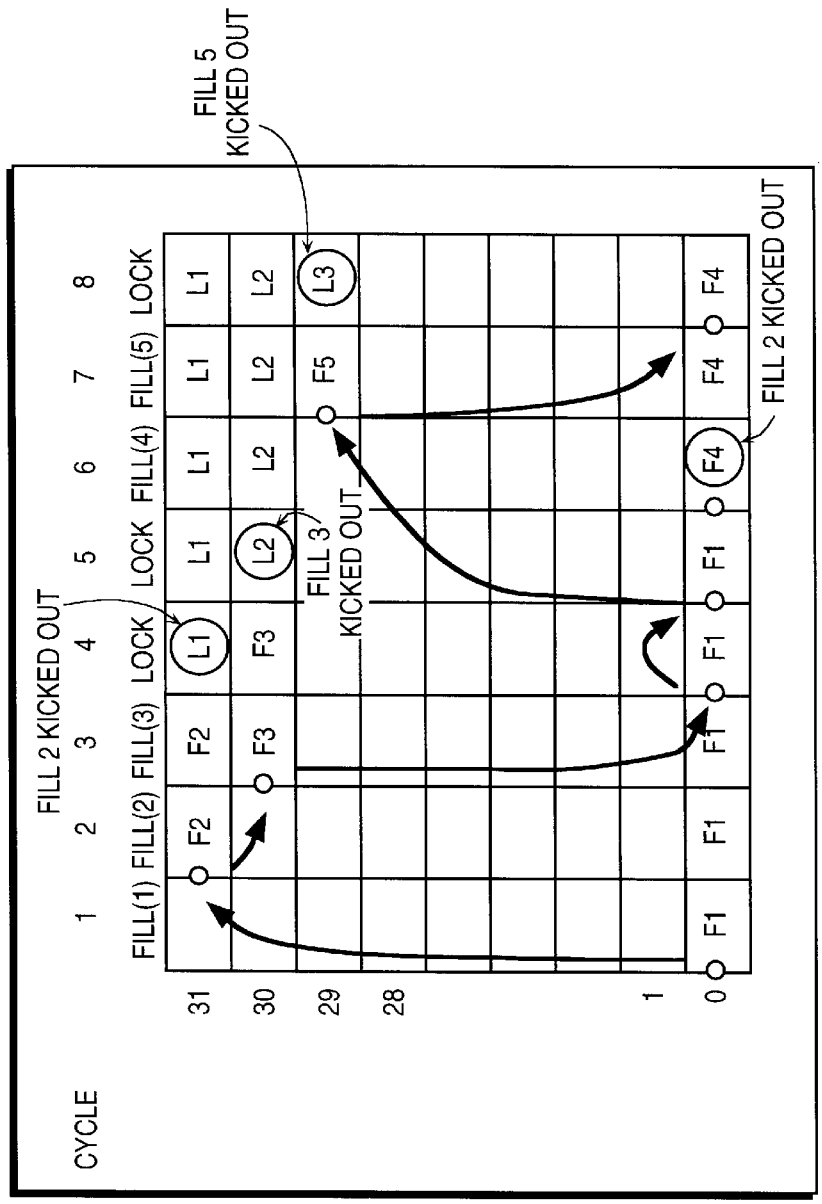
FIG. 3 shows an exemplary series of loads during an eight cycle period.

FIG. 3 shows an exemplary series of loads during an eight cycle period. In cycle one, fill one is loaded into word line zero, and the fill pointer advances to point to word line 31. In cycle two, fill two is loaded into word line 31, and the fill pointer is advanced to point to word line 30. In cycle three, fill three is loaded into word line 30. Then in cycle four, lock one is loaded into the lock starting line (word line 31), kicking out fill two and the fill pointer is reset to point to word line zero. In cycle five, lock two is loaded into the next lock line (word line 30), kicking out fill three and again, the fill pointer is reset to point to word line zero. At cycle six, fill four is loaded, kicking out fill one, and the fill pointer is advanced to point to the highest unlocked line, in this case, word line 29. At cycle seven, fill five fills word line 29. At cycle eight, lock three kicks out fill five, and the fill pointer is reset to point to word line zero. This is merely one exemplary fill and lock pattern. Alternatively, if locks one, two, and three had been done in the first three cycles with fills one through five done in the next five cycles, no data would have been kicked out of the cache. Thus, proper software design can eliminate any potential penalty of restarting the fill portion after each lock. For example, software may lock all code or data which needs to be locked at initialization before filling any cache lines. By doing the locks first, the potential negative impact of locking lines on code already loaded into the cache may be alleviated. An example of code which is desirable to lock will be critical interrupt handling routines or similar code which should respond very quickly. However, the above description is illustrative to explain of the operation of one embodiment of the invention.

Figure 4:
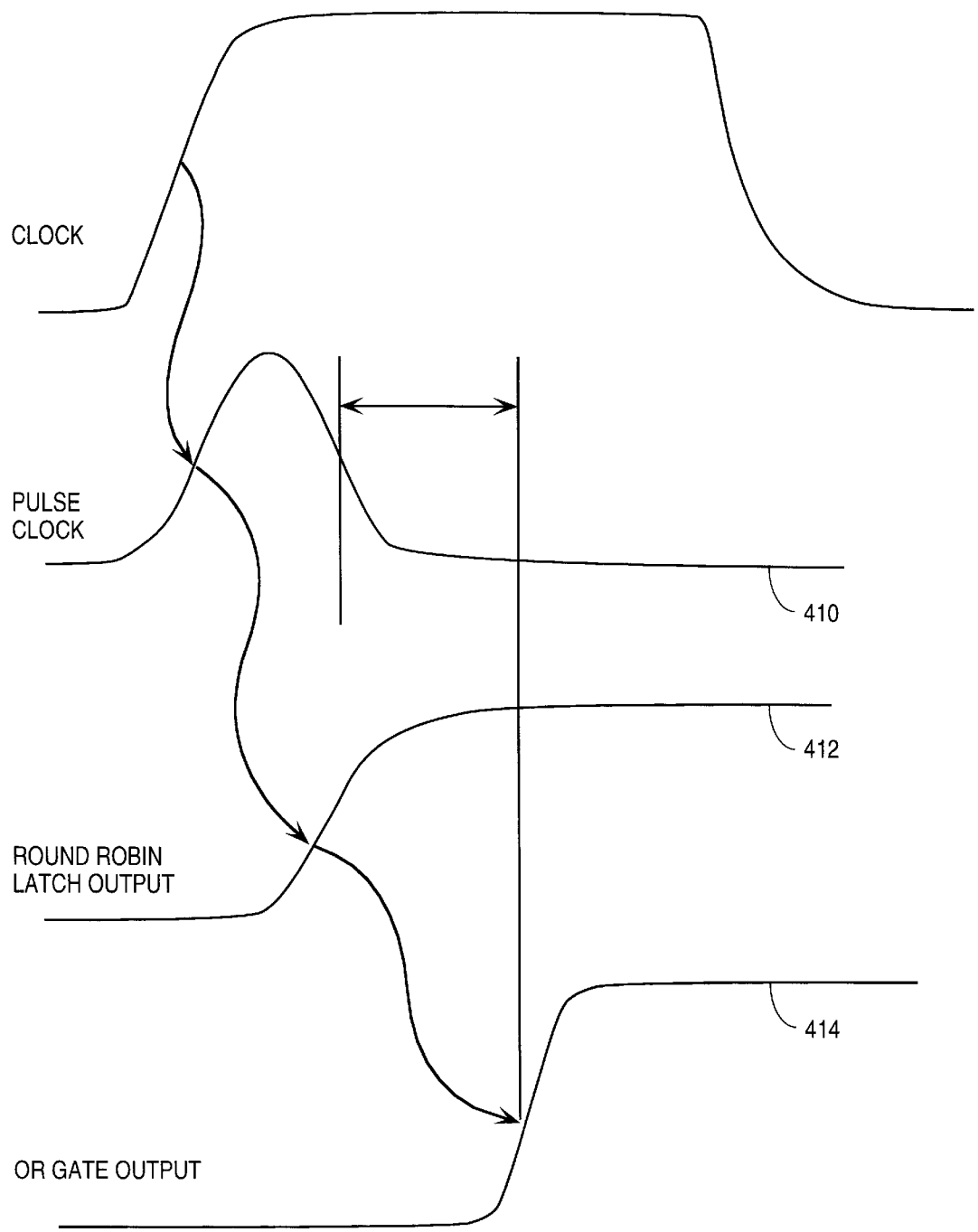
FIG. 4 is a timing diagram for a subset of signals in one embodiment of the invention.

FIG. 4 shows a timing diagram of a subset of signals of one embodiment of the invention. The pulse clock signal 410 is used in the pulse latch embodiment described above. The pulse should be short enough that it will have gone back low before the signal from an adjacent latch can propagate to it neighbor. Thus, the output of round robin latch (212 of FIG. 2) is shown as signal 412. This output goes high responsive to the pulse clock 410. The pulse clock 410 must be low before the output of OR gate (336 of FIG. 1) represented by signal 414 is asserted high based on the application of signal 412 to the OR gate.

In one embodiment, several CAMs, each with an associated round robin and lock logic unit, are used to form a larger cache having a plurality of banks. Each bank implements the round robin and lock scheme within the bank and independent of all other banks.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. An apparatus comprising:
   a first plurality of latches coupled together in a first shift register, each latch of the first plurality associated with a line of a cache, the register defining a fill order for the cache lines; and
   a second plurality of latches coupled together in a second shift register, each latch of the second plurality associated with a cache line, the register defining a lock order for the cache lines.

2. The apparatus of claim 1 further comprising:
   a buffer to amplify an output of a first start register of the first plurality to drive an input for each other register in the first plurality of latches.

3. The apparatus of claim 2 wherein each other register in the first plurality only drives an input for its successor in the plurality of latches.

4. The apparatus of claim 1 wherein the first plurality of latches and the second plurality of latches are different in number.

5. The apparatus of claim 1 wherein a first start register of the first plurality of latches is associated with a cache line an address with a maximum difference from an address of a second cache line associated with a second start register of the second plurality.

6. The apparatus of claim 5 further comprising:
   combinational logic coupling the first and second plurality of latches such that a second fill line is coextensive with a next lock line.

7. The apparatus of claim 1 wherein only one latch of the first plurality of latches has fanout greater than three.

8. The apparatus of claim 1 wherein the cache is a translation lookaside buffer (TLB).

9. The apparatus of claim 1 where the line to be locked is determined by the coincidence of a logical one in the preceding lock register bit and a logical zero in the present bit.

10. The apparatus of claim 1 wherein the first shift register is configured as a circular buffer.

11. The apparatus of claim 10 wherein a length of a circular shift in the first shift register is determined by setting bits in the second shift register.

12. The apparatus of claim 1 wherein each latch comprises a master-slave flipflop.

13. A system comprising:
   a content addressable memory array (CAM);
   a random access memory (RAM) coupled to the CAM; and
   control logic coupled to the CAM to cause the CAM to lock specified lines of the RAM while implementing a round robin replacement scheme for unlocked lines in the RAM.

14. The system of claim 13 wherein the control logic comprises:
   a first plurality of latches coupled together in a daisy chain, each latch of the plurality associated with a line of the RAM, the daisy chain defining a fill order for the RAM lines; and
   a second plurality of latches coupled together in a daisy chain, each register of the second plurality associated with a cache line, the daisy chain defining a lock order for the cache lines.

15. The system of claim 14 wherein the first plurality and the second plurality have a different number of latches.

16. The system of claim 14 wherein a first start register of the first plurality is associated with a cache line having an address with a maximum difference from an address of a second cache line associated with a second start register of the second plurality.

17. The system of claim 16 further comprising:
   combinational logic to reset the first plurality of registers responsive to a change in the second plurality of registers.

18. A method comprising:
   defining a lock starting line;
   defining a fill starting line a distance from the lock starting line; and
   resetting a fill pointer to the fill starting line each time a lock is loaded.

19. The method of claim 18 wherein cycling comprises utilizing a short pulse clock signal to enable shifting of a logical value through a shift register.

20. The method of claim 18 further comprising:
   changing a lock indicator to indicate a line one line closer to the fill starting line responsive to a lock line being loaded.

21. The method of claim 20 further comprising:
   preventing at least the fill starting line from being locked.

22. The method of claim 18 further comprising:
   filling the fill starting line on a first fill; and
   filling an unlocked line most proximate to the lock starting line on a second fill.

23. The method of claim 18 comprising:
   cycling circularly through filling each subsequent unlocked line on successive fills.

24. A computer readable storage media containing executable computer program instructions which when executed cause a digital processing system to perform a method comprising:
   initializing a lock mode in a cache loading lock data into a cache line; and
   locking the cache line; and
   retrieving the cache to fill mode.

* * * * *